(12) United States Patent
Rashid et al.

(10) Patent No.: US 9,602,953 B2
(45) Date of Patent: Mar. 21, 2017

(54) TECHNIQUES AND CONFIGURATIONS ASSOCIATED WITH PARTITIONING OF A COMMUNICATION BAND

(71) Applicant: Intel Corporation, Santa Clara, CA (US)

(72) Inventors: Mohammad Mamunur Rashid, Hillsboro, OR (US); Satish C. Jha, Hillsboro, OR (US); Maruti Gupta, Portland, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 81 days.

(21) Appl. No.: 14/563,930

(22) Filed: Dec. 8, 2014

(65) Prior Publication Data

US 2016/0165606 A1 Jun. 9, 2016

(51) Int. Cl.
*H04W 4/00* (2009.01)
*H04W 48/00* (2009.01)
(Continued)

(52) U.S. Cl.
CPC .......... *H04W 4/005* (2013.01); *H04W 48/00* (2013.01); *H04W 76/00* (2013.01); *H04W 74/006* (2013.01); *H04W 88/08* (2013.01)

(58) Field of Classification Search
None
See application file for complete search history.

(56) References Cited

U.S. PATENT DOCUMENTS

| 2011/0274040 A1* | 11/2011 | Pani | H04W 4/005 370/328 |
| 2013/0083753 A1* | 4/2013 | Lee | H04W 72/0453 370/329 |

(Continued)

FOREIGN PATENT DOCUMENTS

| WO | 2012173385 A2 | 12/2012 |
| WO | 2013082784 A1 | 6/2013 |

OTHER PUBLICATIONS

3GPP, "Evolved Universal Terrestrial Radio Access (E-UTRA); Medium Access Control (MAC) protocol specification (Release 12)," 3GPP TS 36.321 V12.3.0 (Sep. 2014), Sep. 23, 2014, Lte Advanced, 57 pages.

(Continued)

*Primary Examiner* — Diane Lo
(74) *Attorney, Agent, or Firm* — Schwabe, Williamson & Wyatt, P.C.

(57) ABSTRACT

Embodiments of the present disclosure describe systems and methods for partitioning radio frequency spectrum for multiple categories of communication. Various embodiments may include partitioning of an available frequency band into a first partition for a first category of communication and a second partition for a second category of communication. In embodiments, the first category of communication may be designed for devices having a relatively lower cost of implementation than the second category of communication. In some embodiments, the first partition may be aggregated opportunistically with the second partition based on certain conditions such as, for example, under utilization of the first partition. Other embodiments may be described and/or claimed.

25 Claims, 5 Drawing Sheets

(51) Int. Cl.
*H04W 76/00* (2009.01)
*H04W 74/00* (2009.01)
*H04W 88/08* (2009.01)

(56) References Cited

U.S. PATENT DOCUMENTS

| | | | |
|---|---|---|---|
| 2013/0176995 A1* | 7/2013 | Park | H04W 72/06 370/336 |
| 2013/0183987 A1 | 7/2013 | Vrzic et al. | |
| 2013/0294361 A1 | 11/2013 | Chen et al. | |
| 2013/0322363 A1 | 12/2013 | Chen et al. | |
| 2014/0098761 A1* | 4/2014 | Lee | H04W 74/006 370/329 |
| 2014/0128029 A1* | 5/2014 | Fong | H04W 48/12 455/411 |
| 2015/0208415 A1* | 7/2015 | Xu | H04L 5/001 370/329 |
| 2016/0112997 A1* | 4/2016 | Chen | H04W 72/042 370/329 |

OTHER PUBLICATIONS

3GPP, "Evolved Universal Terrestrial Radio Access (E-UTRA); Radio Resource Control (RRC); Protocol specification (Release 12)," 3GPP TS 36.331 V12.3.0 (Sep. 2014), Sep. 23, 2014, Lte Advanced, 191 pages.
3GPP, "Evolved Universal Terrestrial Radio Access (E-UTRA); User Equipment (UE) procedures in idle mode (Release 12)," 3GPP TS 36.304 V12.2.0 (Sep. 2014), Sep. 23, 2014, Lte Advanced, 37 pages.
International Search Report and Written Opinion for PCT/US2015/034032 mailed on Oct. 13, 2015; 12 pages.

* cited by examiner

TECHNIQUES AND CONFIGURATIONS ASSOCIATED WITH PARTITIONING OF A COMMUNICATION BAND

FIELD

Embodiments of the present disclosure generally relate to the field of wireless communication, and more particularly, to partitioning of a communication band.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Machine-Type Communication (MTC) is a promising and emerging technology. Potential MTC based applications include smart metering, healthcare monitoring, remote security surveillance, intelligent transportation systems, etc. These services and applications stimulate the design and development of a new type of MTC device that may need to be integrated into current and next generation mobile broadband networks such as LTE and LTE-Advanced.

An emerging category of MTC devices includes devices that may be designed to support a relatively lower cost structure than traditional MTC devices or devices designed for human-type communications (HTC). Such lower cost MTC devices may be commonly referred to as low-cost MTC (LC-MTC) devices. The existing mobile broadband networks, however, were primarily designed to increase performance for HTC, not MTC. This issue may be compounded when considering LC-MTC design. Currently all of these devices, including LC-MTC devices, coexist on the same broadband network which may limit the cost reductions an LC-MTC device may be able to realize.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
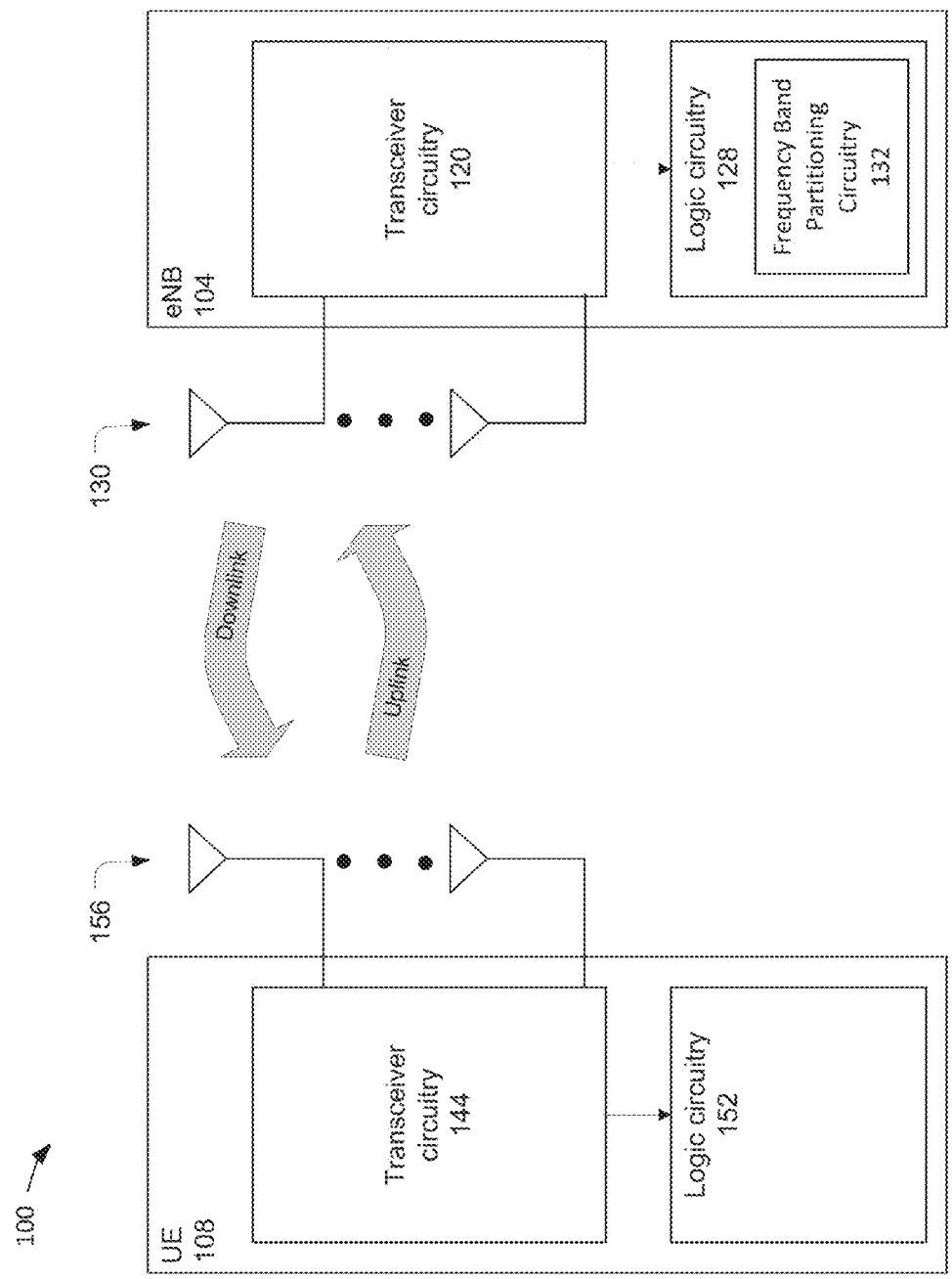
FIG. 1 schematically illustrates a wireless communication environment in accordance with various embodiments of the present disclosure.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As discussed above, currently all devices, or user equipments (UEs), including LC-MTC UEs, normal cost MTC UEs and human type communication UEs, coexist in the same physical cells and utilize the same resources. To realize the cost savings of LC-MTC UEs, however, these cells may need to support physical layer limitations (e.g., a buffering ability of only 6 or 15 physical resource blocks (PRBs)) as well as coverage enhancements of up to 20 dB for both uplink transmissions as well as downlink transmissions. To address these limitations and the coverage enhancement needs, the current long-term evolution (LTE) air interface may need to undergo some changes. However, these changes to the LTE air interface to address the limitations of LC-MTC UEs and meet the coverage enhancement needs of LC-MTC UEs may impact performance of other non-LC-MTC UEs, e.g. regular MTC UEs or human-type communication UEs, also referred to herein collectively as regular UEs. As a result, changes designed specifically for LC-MTC UEs may be overlooked because of the detrimental impact such changes may have to the performance of regular UEs. On the other hand, meeting even basic needs for LC-MTC UEs may have potentially major implications to performance of regular UEs. For example, limiting the system information messages to 6 or 15 PRBs may unduly constrain the amount of information that can be carried, or impact how system information messages are designed for regular UEs. In addition, a very high number of repetitions (e.g., 100 or more repetitions to reach a 20 dB coverage enhancement) of the same broadcast message may be needed to achieve a desired coverage enhancement level for LC-MTC. Because LC-MTC deployment in an LTE network may come with significant costs to the performance of regular UEs, network operators may be unlikely to transition to LC-MTC UE deployment in LTE.

As a result of the above-discussed issues, and to make LC-MTC UE deployment in an LTE network viable in practice, addressing objectives of LC-MTC UEs in an efficient way while making sure that the performance of regular UEs is not significantly impacted is desired. In embodiments, desired objectives of LC-MTC UEs may be realized by partitioning the available spectrum into two categories of communication. One partition designed for LC-MTC communications and another partition designed for regular, non-LC-MTC.

FIG. 1 schematically illustrates a wireless communication environment 100 in accordance with various embodiments. The environment 100 may include a UE 108 in wireless communication with an access node such as evolved node B (eNB) 104. The eNB 104 may be part of a 3rd Generation Partnership Project (3GPP) long-term evolution (LTE) network (or an LTE-Advanced (LTE-A) network). In particular, the eNB 104 may be part of a radio access network (RAN) of the LTE/LTE-A network, such as an evolved universal terrestrial radio access network (E-UTRAN). The E-UTRAN may be coupled with a core network such as an Evolved Packet Core (EPC) that performs various management and control functions of the LTE/LTE-A network and further provides a communication interface between various RANs and other networks.

The eNB 104 may include transceiver circuitry 120 with which to receive uplink transmissions from UE 108 via one or more antennas 130 and transmit downlink transmissions to UE 108 via the one or more antennas 130. eNB 104 may also include logic circuitry 128 coupled with transceiver circuitry 120. In embodiments logic circuitry 128 may be configured to decode and encode information transmitted in signals communicated between UE 108 and eNB 104. Logic circuitry 128 may further be configured by frequency band partitioning circuitry 132 to perform any portion of the processes for frequency band partitioning described herein.

UE 108 may include transceiver circuitry 144, logic circuitry 152, and one or more antennas 156. Transceiver circuitry 144 may be coupled with the one or more antennas 156 to receive downlink transmission from eNB 104 and transmit uplink transmissions to eNB 104. Logic circuitry 152 may be coupled to transceiver circuitry 144, and may be configured to decode and encode information transmitted in signals communicated between the UE 108 and the eNB 104. Logic circuitry 152 may further be configured to perform any portion of the processes described below.

Figure 2:
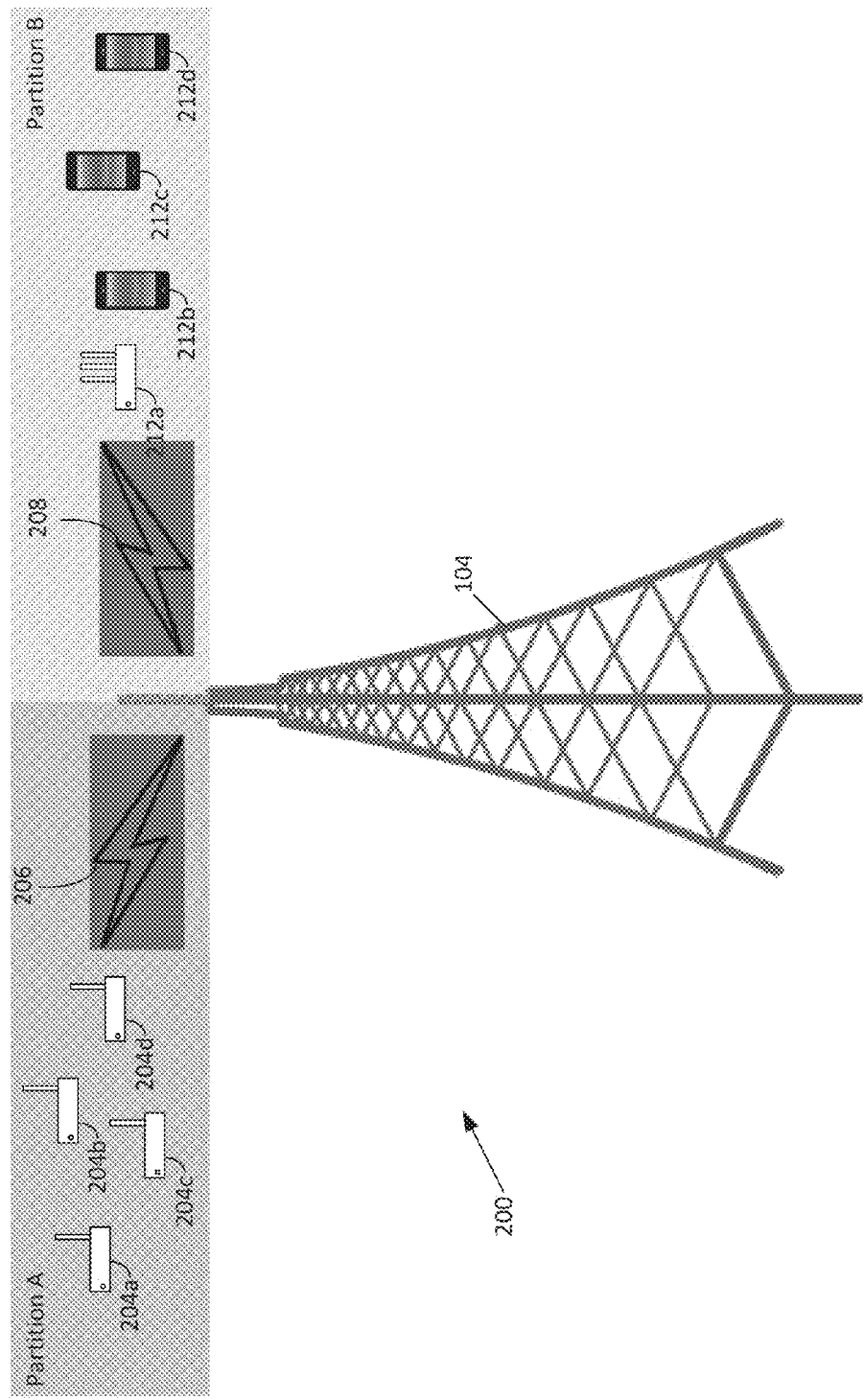
FIG. 2 is an illustrative depiction of a wireless communication environment partitioned in accordance with various embodiments of the present disclosure.

FIG. 2 is an illustrative depiction of a wireless communication network 200 partitioned in accordance with various embodiments of the present disclosure. Wireless communication network may include eNB 104 and a variety of UEs (e.g., UEs 204a-204d and 212a-212d) within operational proximity of eNB 104. As used herein, operational proximity may include a proximity around an access node (e.g., eNB 104) in which UEs within the proximity may utilize the access node in accessing the cellular network.

In embodiments, eNB 104 may partition the available communication band to provide for a first partition, partition A, associated with a first category of communication and a second partition, partition B, associated with a second category of communication. For example, in LTE embodiments, the available communication band may span from 1.4 megahertz (MHz) to 20 MHz. In such an embodiment, eNB 104 may partition this band such that partition A is limited to 1.4 MHz, while partition B encompasses the remainder of the communication band. In some embodiments, the first category of communication may include communications designed for relatively lower cost devices than the second category of communication. For example, the first category of communication may include LC-MTC, while the second category may include regular, or non-LC-MTC, communications.

Partition A may, in some embodiments, be associated with a first air interface 206, also known as a physical layer (PHY). In contrast, partition B 210 may be associated with a second air interface 208. In such embodiments, first air interface 206 may include a first control channel format designed for the first category of communication while second air interface 208 may include a second control channel format designed for the second category of communication.

In embodiments, eNB 104 may transmit, via transceiver circuitry, such as transceiver circuitry 120 of FIG. 1, first connection information in the first control channel format to UEs 204a-204d over partition A. Such a transmission may be, for example, a broadcast transmission, such as a primary downlink shared channel (PDSCH) transmission that is adapted for the first control channel format. In embodiments, UEs 204a-204d may include, for example, LC-MTC UEs. The first connection information may be designed to enable UEs 204a-204d to establish communication with eNB 104 via partition A. The eNB 104 may also transmit, via the transceiver circuitry, second connection information in the second control channel format to UEs 212a-212d over partition A. Such a transmission may again be a broadcast transmission, such as, for example, a PDSCH transmission. In embodiments, UEs 212a-212d may be, for example, regular, non-LC-MTC, UEs. In such embodiments, by partitioning LC-MTC UEs into partition A and non-LC-MTC UEs into partition B, as described above, changes to the air interface for partition A, to accommodate LC-MTC may be made without impacting the operation or performance of regular, non-LC-MTC UEs.

Figure 4:
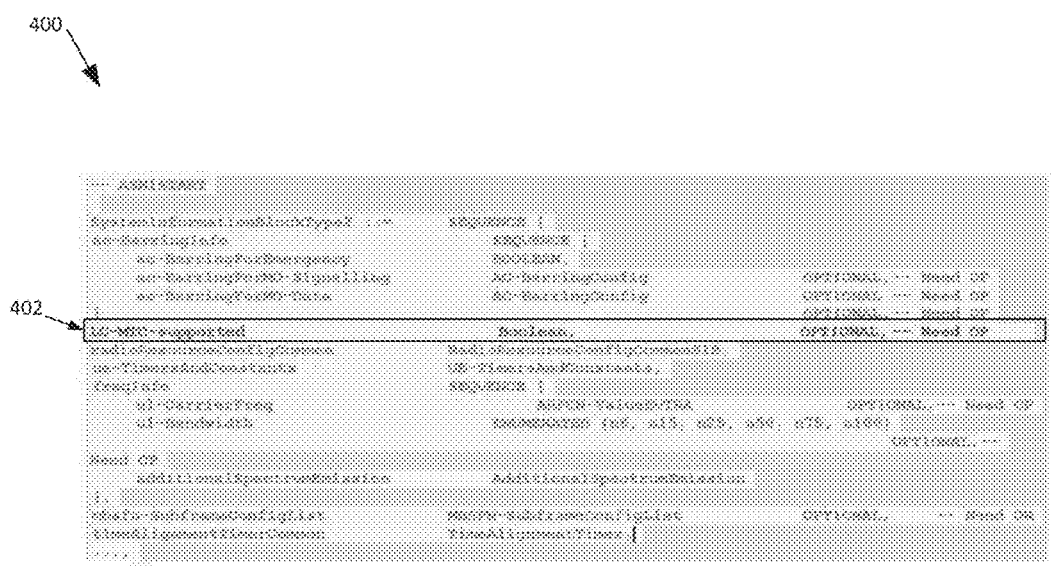
FIG. 4 is a sample system information block (SIB) in accordance with various embodiments of the present disclosure.

In some embodiments, UEs 204a-204d may be barred from utilizing partition B and UEs 212a-212d may be barred from utilizing partition A. Such barring may be accomplished, for example, by designing the first control channel format to prevent UEs 212a-212d from establishing communication with eNB 104 over partition A. In addition, the second control channel format may be designed to prevent UE's 204a-204d from establishing communication with eNB 104 over partition B. For example, the first control channel format may include a first system information block 1 (SIB1) format and the second control channel format may include a second SIB1 format. In embodiments, the format of the first SIB1 may be designed to prevent UEs 212a-212d from being able to parse connection information transmitted in such a format, which may prevent UEs 212a-212d from communicating with eNB 104 over partition A. In addition, the format of the second SIB1 may be designed to prevent UEs 204a-204d from being able to parse connection information transmitted in such a format, which may prevent UEs 204a-204d from communicating with eNB 104 over partition B. In other embodiments, first SIB1 and second SIB1 may be the same format, but may have an indicator of which communication category is supported by the partition. Such an SIB1 format is depicted in FIG. 4, discussed below. In other embodiments, a change to the medium access control (MAC) may be needed to support the UEs 204a-204d. In such embodiments, there may be a first MAC associated with partition A and a second MAC associated with partition B, first and second MAC may act in a similar manner to the first and second SIB1 discussed above.

In other embodiments, such barring may be accomplished utilizing an access class barring (ACB) mechanisms. In the 3rd Generation Partnership Project (3GPP), the ACB mechanism may be utilized by an access node, such as eNB 104, to allow the access node to control access attempts from UEs over a random access channel (RACH). Access Classes (AC) are currently defined ranging from 0 to 15. Through the broadcast of AC barring parameters (e.g., ac-BarringFactor/ac-BarringForEmergency/ac-BarringForSpecialAC) an access node may control the access of UEs to the cellular network based on the access class to which the UE may be assigned. The ac-BarringFactor is the probability that a UE passes the "persistent" test. The persistent test is passed if a random number generated by the UE is lower than the ac-BarringFactor. Otherwise the access is barred.

In such an access class barring mechanism, UEs 212a-212d may be associated with access classes 0-15, discussed above. UEs 204a-204d may, on the other hand, be associated with a newly created access class 16 for LC-MTC access. In embodiments, such an access class may be associated, for example, with ac-BarringFactorForLCMTC. In such embodiments, the first connection information may define access class barring parameters that utilize the classes 0-15 to prevent UEs 212a-212d from establishing communication with eNB 104 via partition A and may utilize the newly created access class 16 to allow UEs 204a-204d to establish communication with eNB 104 via partition A. In turn, the second connection information may define access class barring parameters that utilize access class 16 to prevent the UEs 204a-204b from establishing communication with eNB 104 over partition B and utilize access classes 0-15 to allow UEs 212a-212d to establish communication with eNB 104 over partition B.

In further embodiments, eNB 104 may be configured to opportunistically utilize partition A when partition A is not fully utilized. In such embodiments, the second connection information may include resource information for partition A that may designate partition A as a secondary serving cell and partition B as a primary serving cell. In such embodiments, eNB 104 may be configured to perform carrier aggregation between partition A and partition B via cross carrier scheduling, in instances where the PDCCH and other control channel format of partition A and partition B are not different. In other embodiments, if partition A has very low or non-existent LC-MTC UEs, then the eNB may deactivate partition A and merge it with partition B. Such an embodiment may be utilized, for example, where LC-MTC UEs are only expected to be active during predefined periods of time.

Figure 3:
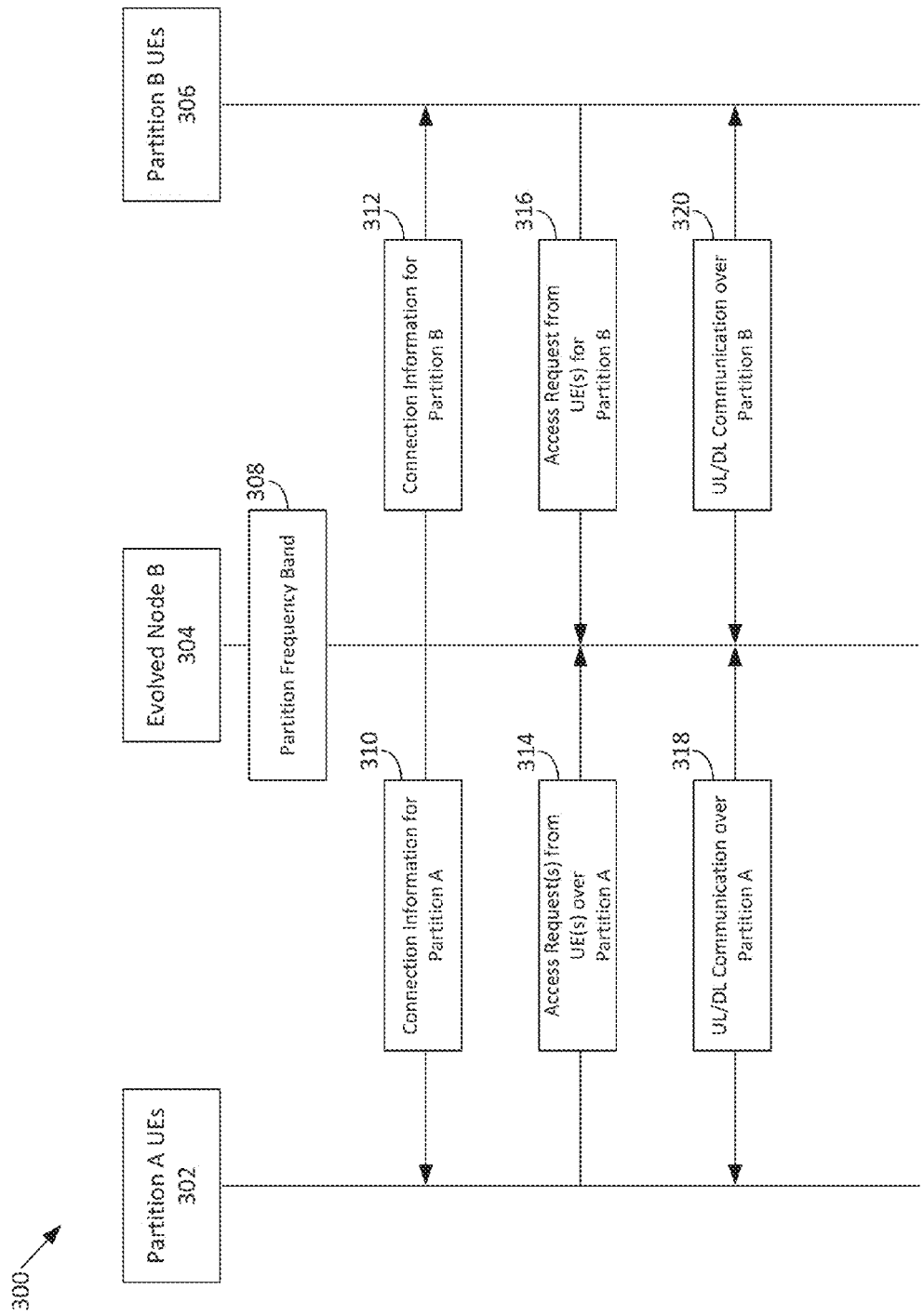
FIG. 3 is a flowchart illustrating a process of an evolved node B (eNB) partitioning a communication band in accordance with various embodiments of the present disclosure.

FIG. 3 is a flowchart illustrating a process flow 300 of an evolved node B (eNB) 304, such as eNB 104 of FIGS. 1 and 2, partitioning a communication band in accordance with various embodiments of the present disclosure. The process flow may begin at block 308, where eNB 304 may partition the frequency band to provide for a first partition, partition A, associated with a first category of communication and a second partition, partition B, associated with a second category of communication. Such a partitioning may be accomplished in the same or a similar manner to that discussed above in reference to FIG. 2. Also as discussed above, in some embodiments, the first category of communication may include communications designed for relatively lower cost devices than the second category of communication. For example, the first category of communication may include LC-MTC, while the second category may include regular communications, or non-LC-MTC.

At block 310, first connection information for partition A may be transmitted by eNB 304 to at least the UEs intended to utilize partition A (e.g., UEs associated with the first category of communication). At block 312 second connection information for partition B may be transmitted by eNB 304 to at least the UEs intended to utilize partition B (e.g., UEs associated with the second category of communication). In embodiments, the first connection information for partition A may be transmitted in a first control channel format designed for the first category of communication and the second connection information for partition B may be transmitted in a second control channel format designed for the second category of communication. Such transmissions may be broadcast transmissions, such as a PDCCH transmission, associated with respective air interfaces of partitions A and B.

The first connection information may be designed to enable the UEs associated with the first category of communication to establish communication with eNB 304 via partition A. The second connection information, on the other hand, may be designed to enable the UEs associated with the second category of communication to establish communication with eNB 304 via partition B. As mentioned above, the first category of communication may, in some embodiments, be LC-MTC and, consequently, the UEs intended to utilize partition A may be LC-MTC UEs. The second category of communication may be regular communications, or non-LC-MTC, and, consequently, the UEs intended to utilize partition B may be regular, or non-LC-MTC, UEs. In such embodiments, by partitioning LC-MTC UEs into partition A and non-LC-MTC UEs into partition B, as described above, changes to the air interface for partition A, to accommodate LC-MTC may be made without impacting the operation or performance of regular, non-LC-MTC UEs.

In some embodiments, UEs associated with the first category of communication may be barred from utilizing partition B and UEs associated with the second category of communication may be barred from utilizing partition A. Such barring may be accomplished, for example, by designing the respective control channel formats to prevent unintended UEs from establishing communication with eNB 304 over a respective partition. For example, first control channel format may include a first system information block 1 (SIB1) format and the second control channel format may include a second SIB1 format. In such an example, the format of the first SIB1 may be designed to prevent UEs associated with the second category of communication from being able to parse connection information transmitted in such a format, which may prevent the UEs associated with the second category of communication from communicating with eNB 304 over partition A. In addition, the format of the second SIB1 may be designed to prevent UEs associated with the first category of communication from being able to parse connection information transmitted in such a format, which may prevent UEs associated with the first category of communication from communicating with eNB 304 over partition B.

In other embodiments, such barring may be accomplished utilizing access class barring (ACB) mechanism, such as that discussed above in reference to FIG. 2. In such embodiments, UEs associated with the first category of information may be able to parse the second connection information, and vice versa; however, the access class barring mechanism may prevent UEs associated with the first category of communication from establishing communication with eNB 304 via partition B, and vice versa.

At block 314, eNB 304 may receive access requests over partition A from the UEs associated with the first category of communication. Such a request may be accomplished utilizing the first connection information that was transmitted to such UEs at block 310. In addition, at block 316, eNB 304 may receive access requests over partition B from the UEs associated with the second category of communication. Such a request may be accomplished utilizing the second connection information that was transmitted to such UEs at block 312. These access requests may be transmitted to eNB 304 via, for example, a RACH transmission. At block 318, uplink (UL) and downlink (DL) data may be communicated over partition A between eNB 304 and the UEs associated with the first category of communication. And, at block 320, UL/DL data may be communicated over partition B between eNB 304 and the UEs associated with the second category of communication.

In further embodiments, eNB 304 may be configured to opportunistically utilize partition A when partition A is not fully utilized. In such embodiments, the second connection information, discussed above, may include resource information for partition A that may designate partition A as a secondary serving cell and partition B as a primary serving cell. In such embodiments, eNB 304 may be configured to perform carrier aggregation between partition A and partition B via cross carrier scheduling.

FIG. 4 is a sample system information block type 2 (SIB2) 400 in accordance with various embodiments of the present disclosure. In some embodiments, an eNB, such as one of the eNBs discussed elsewhere herein, may signal through system information messages, such as SIB2 400, whether a cell is capable of supporting one of the categories of communication discussed above, such as, for example, LC-MTC. As can be seen, SIB2 400 integrates a Boolean variable LC-MTC-supported in line 402. Such a variable may indicate to a UE whether LC-MTC is supported in a partition associated with SIB 2 400. If SIB2 400 indicates that LC-MTC is supported then an LC-MTC UE may attempt to access the associated partition, otherwise an LC-MTC UE may refrain from attempting to connect to the partition. In addition, if LC-MTC is supported, a regular, non-LC-MTC UE, may refrain from attempting to connect to such a partition, whereas, if SIB2 indicates that LC-MTC is not supported a regular, or non-LC-MTC, UE may attempt to access eNB over the associated partition. As such, even if a UE associated with a category of communication that is not supported in the associated partition is able to decode, or parse, SIB2 400, it may refrain from attempting to connect.

Figure 5:
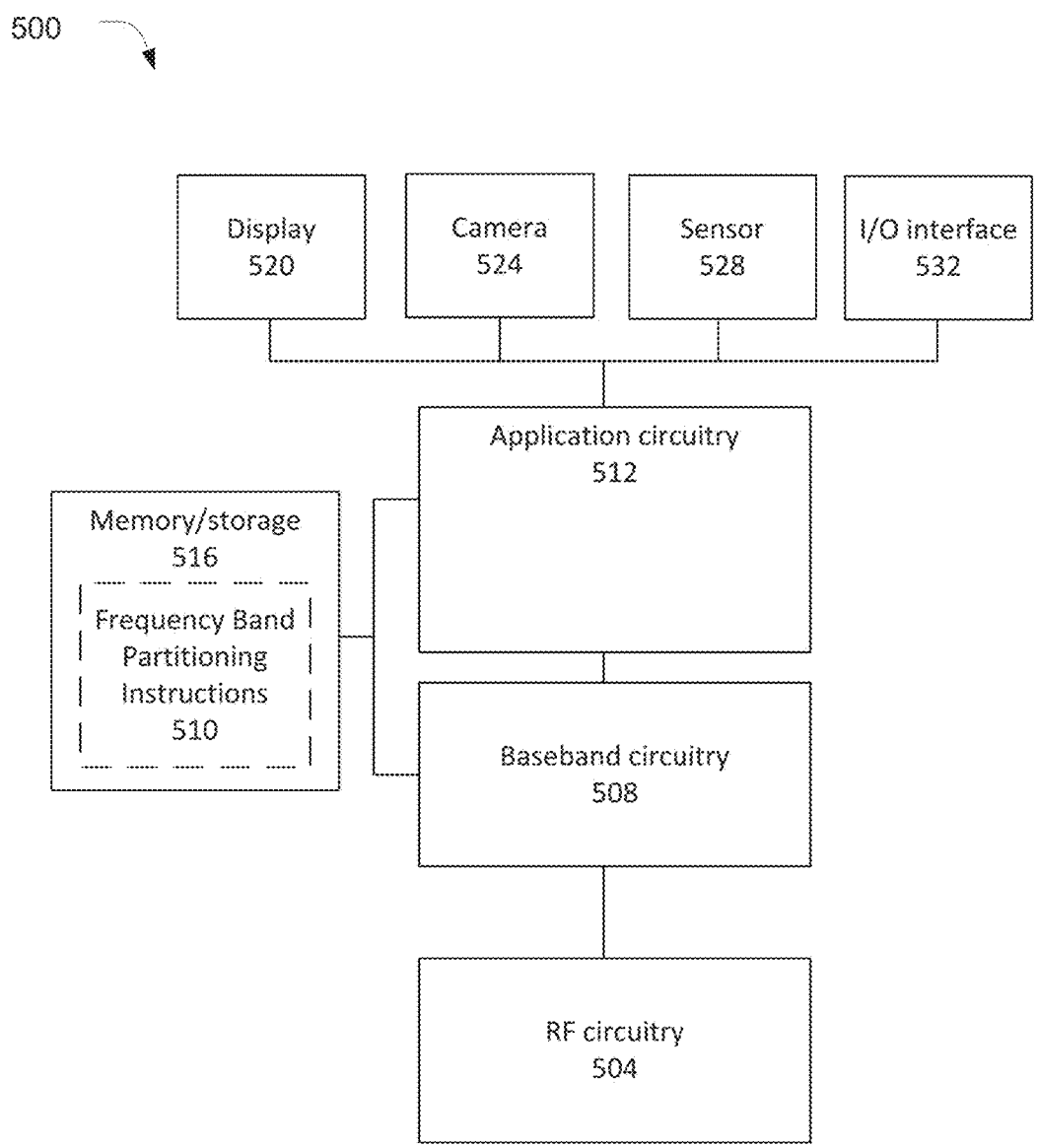
FIG. 5 is a block diagram of an example computing device that may be used to practice various embodiments described herein.

The UE 108 as described herein may be implemented into a system using any suitable hardware, firmware, and/or software configured as desired. FIG. 5 illustrates, for one embodiment, an example system 500 comprising radio frequency (RF) circuitry 504, baseband circuitry 508, application circuitry 512, memory/storage 516, display 520, camera 524, sensor 528, and input/output (I/O) interface 532, coupled with each other at least as shown.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications and/or operating systems running on the system 500.

The baseband circuitry 508 may include circuitry such as, but not limited to, one or more single-core or multi-core processors. The processor(s) may include a baseband processor. The baseband circuitry 508 may handle various radio control functions that enable communication with one or more radio networks via the RF circuitry 504. The radio control functions may include, but are not limited to, signal modulation, encoding, decoding, radio frequency shifting, etc. In some embodiments, the baseband circuitry 508 may provide for communication compatible with one or more radio technologies. For example, in some embodiments, the baseband circuitry 508 may support communication with an E-UTRAN and/or other wireless metropolitan area networks (WMAN), a wireless local area network (WLAN), or a wireless personal area network (WPAN). Embodiments in which the baseband circuitry 508 is configured to support radio communications of more than one wireless protocol may be referred to as multi-mode baseband circuitry.

In various embodiments, baseband circuitry 508 may include circuitry to operate with signals that are not strictly considered as being in a baseband frequency. For example, in some embodiments, baseband circuitry 508 may include circuitry to operate with signals having an intermediate frequency, which is between a baseband frequency and a radio frequency.

In some embodiments, the transceiver circuitry 112 and/or the logic circuitry 152 may be embodied in the application circuitry 512 and/or the baseband circuitry 508.

RF circuitry 504 may enable communication with wireless networks using modulated electromagnetic radiation through a non-solid medium. In various embodiments, the RF circuitry 504 may include switches, filters, amplifiers, etc., to facilitate the communication with the wireless network.

In various embodiments, RF circuitry 504 may include circuitry to operate with signals that are not strictly considered as being in a radio frequency. For example, in some embodiments, RF circuitry 504 may include circuitry to operate with signals having an intermediate frequency, which is between a baseband frequency and a radio frequency.

In some embodiments, the wireless transceiver 144 may be embodied in the RF circuitry 504.

In some embodiments, some or all of the constituent components of the baseband circuitry 508, the application circuitry 512, and/or the memory/storage 516 may be implemented together on a system on a chip (SOC).

Memory/storage 516 may be used to load and store data and/or instructions, for example frequency band partitioning instructions 510 which may be configured to cause system 500 to carry out any portion of the partitioning process discussed herein. Memory/storage 516 for one embodiment may include any combination of suitable volatile memory (e.g., dynamic random access memory (DRAM)) and/or non-volatile memory (e.g., Flash memory).

In various embodiments, the I/O interface 532 may include one or more user interfaces designed to enable user interaction with the system 500 and/or peripheral component interfaces designed to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 528 may include one or more sensing devices to determine environmental conditions and/or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 and/or RF circuitry 504 to communicate with components of a positioning network, e.g., a global positioning system (GPS) satellite.

In various embodiments, the display 520 may include a display (e.g., a liquid crystal display, a touch screen display, etc.).

In various embodiments, the system 500 may be a mobile computing device such as, but not limited to, a laptop computing device, a tablet computing device, a netbook, an ultrabook, a smartphone, etc. In various embodiments, system 500 may have more or fewer components, and/or different architectures.

EXAMPLES

The following paragraphs describe examples of various embodiments.

Example 1 may include an evolved node B (eNB) comprising: logic circuitry to: partition a communication band into a first partition for a first category of communication and a second partition for a second category of communication, wherein the first partition is associated with a first control channel format and the second partition is associated with a second control channel format; and transceiver circuitry, coupled with the logic circuitry, to: transmit first connection information in the first control channel format to a first plurality of user equipments (UEs) over the first partition to enable the first plurality of UEs to establish communication with the eNB via the first partition, wherein the first plurality of UEs are configured for the first category of communication; and transmit second connection information in the second control channel format to a second plurality of UEs over the second partition to enable the second plurality of UEs to establish communication with the eNB via the second partition, wherein the second plurality of UEs are configured for the second category of communication.

Example 2 may include the subject matter of Example 1, wherein the second connection information includes resource information of the first partition and designates the first partition as a secondary serving cell, and wherein the logic circuitry is further to perform carrier aggregation between the first partition and the second partition via cross carrier scheduling.

Example 3 may include the subject matter of any one of Examples 1-2, wherein the first plurality of UEs are associated with a first access class and the second plurality of UEs are associated with one or more additional access classes.

Example 4 may include the subject matter of Example 3, wherein the first connection information defines access class barring parameters that utilize the one or more additional access classes to prevent second plurality of UEs from establishing communication with the eNB over the first partition and the second connection information defines access class barring parameters that utilize the first access class to prevent the first plurality of UEs from establishing communication with the eNB over the second partition.

Example 5 may include the subject matter of any one of Examples 1-4, wherein the first plurality of UEs are relatively lower cost UEs than the second plurality of UEs, and wherein the first control channel format is designed for relatively lower cost UEs.

Example 6 may include the subject matter of Example 5, wherein the first control channel format is designed to prevent the second plurality of UEs from establishing communication with the eNB over the first partition, and the second control channel format is designed to prevent the first plurality of UE's from establishing communication with the eNB over the second partition.

Example 7 may include the subject matter of either of Examples 5 or 6, wherein first connection information includes a first system information block 1 (SIB1) and the second connection information includes a second SIB1, wherein a format of the first SIB1 is to prevent the second plurality of UEs from establishing communication with the eNB over the first partition and a format of the second SIB1 is to prevent first plurality of UEs from establishing communication with the eNB over the second partition.

Example 8 may include the subject matter of any one of Examples 1-7, wherein the first category of communication is machine type communication (MTC) designed for relatively lower cost implementation than the second category of communication and the first plurality of UEs are all MTC UEs designed for the relatively lower cost implementation.

Example 9 may include a method comprising: transmitting, by an evolved node B (eNB), first connection information via a first air interface to a first plurality of UEs over a first partition, wherein the first partition is associated with a first category of communication and the first connection information is to enable the first plurality of UEs to establish communication with the eNB via the first partition; and transmitting, by the eNB, second connection information via a second air interface to a second plurality of UEs over a second partition, wherein the second partition is associated with a second category of communication and the second connection information is to enable the second plurality of UEs to establish communication with the eNB via the second partition.

Example 10 may include the subject matter of Example 9, wherein the second connection information includes resource information of the first partition and designates the first partition as a secondary serving cell, and further comprising: performing, by the eNB, carrier aggregation between the first partition and the second partition via cross carrier scheduling.

Example 11 may include the subject matter of either of Examples 9 or 10, wherein the first plurality of UEs are associated with a first access class and the second plurality of UEs are associated with one or more additional access classes.

Example 12 may include the subject matter of Example 11, wherein the first connection information defines access class barring parameters that utilize the one or more additional access classes to prevent the second plurality of UEs from establishing communication with the eNB over the first partition and the second connection information defines access class barring parameters that utilize the first access class to prevent the first plurality of UEs from establishing communication with the eNB over the second partition.

Example 13 may include the subject matter of any one of Examples 9-12, wherein the first plurality of UEs are relatively lower cost UEs than the second plurality of UEs, and wherein a first control channel format of the first air interface is designed for relatively lower cost UEs.

Example 14 may include the subject matter of Example 13, wherein the first control channel format is designed to prevent the second plurality of UEs from establishing communication with the eNB over the first partition, and a second control channel format of the second air interface is designed to prevent the first plurality of UE's from establishing communication with the eNB over the second partition.

Example 15 may include the subject matter of either of Examples 13 or 14, wherein first connection information includes a first system information block 1 (SIB1) and the second physical connection information includes a second SIB1, wherein a format of the first SIB1 is to prevent the second plurality of UEs from establishing communication with the eNB over the first partition and a format of the second SIB1 is to prevent first plurality of UEs from establishing communication with the eNB over the second partition.

Example 16 may include the subject matter of any one of Examples 9-15, wherein the first category of communication is machine type communication (MTC) designed for relatively lower cost implementation than the second category of communication and the first plurality of UEs are all MTC UEs designed for the relatively lower cost implementation.

Example 17 may include one or more computer-readable non-transitory media, having instructions stored thereon, the instructions, in response to execution by an eNB, to cause the eNB to: transmit first connection information via a first air interface to a first plurality of UEs over a first partition, wherein the first partition is associated with a first category of communication and the first connection information is to enable the first plurality of UEs to establish communication with the eNB via the first partition; and transmit second connection information via a second air interface to a second plurality of UEs over a second partition, wherein the second partition is associated with a second category of communication and the second connection information is to enable the second plurality of UEs to establish communication with the eNB via the second partition.

Example 18 may include the subject matter of Example 17, wherein the second connection information includes resource information of the first partition and designates the first partition as a secondary serving cell, and wherein the instructions further cause the eNB to perform carrier aggregation between the first partition and the second partition via cross carrier scheduling.

Example 19 may include the subject matter of either of Examples 17 or 18, wherein the first plurality of UEs are associated with a first access class and the second plurality of UEs are associated with one or more additional access classes, and wherein the first connection information defines access class barring parameters that utilize the one or more additional access classes to prevent second plurality of UEs from establishing communication with the eNB over the first partition and the second connection information defines access class barring parameters that utilize the first access class to prevent the first plurality of UEs from establishing communication with the eNB over the second partition.

Example 20 may include the subject matter of any one of Examples 17-19, wherein the first plurality of UEs are relatively lower cost UEs than the second plurality of UEs, and wherein a first control channel format of the first air interface is designed for relatively lower cost UEs, and wherein the first control channel format is designed to prevent the second plurality of UEs from establishing communication with the eNB over the first partition, and a second control channel format of the second air interface is designed to prevent the first plurality of UE's from establishing communication with the eNB over the second partition.

Example 21 may include the subject matter of any one of Examples 17-20, wherein the first category of communication is machine type communication (MTC) designed for relatively lower cost implementation than the second category of communication and the first plurality of UEs are all MTC UEs designed for the relatively lower cost implementation.

Example 22 may include a user equipment (UE) comprising: transceiver circuitry to: receive first connection information in a first control channel format from an evolved node B (eNB) over a first partition; and receive second connection information in a second control channel format from the eNB over a second partition; and logic circuitry, coupled with the transceiver circuitry, to: determine one of the first connection information or the second connection information to utilize in establishing communication with the eNB via the first partition or the second partition, respectively.

Example 23 may include the subject matter of Example 22, wherein to determine one of the first connection information or the second connection information to utilize in establishing communication with the eNB via the first partition or the second partition, respectively, is based on one or more of: whether the UE is capable of decoding one of the first connection information or the second connection information; and access class barring parameters contained within one or both of the first connection information or the second connection information.

Example 24 may include the subject matter of either one of Examples 22 or 23, wherein the first control channel format is designed for a first category of communication and the second control channel format is designed for a second category of communication.

Example 25 may include the subject matter of Example 24, wherein the first category of communication is machine type communication (MTC) designed for relatively lower cost implementation than the second category of communication, and wherein the UE is associated with the first category of communication.

Example 26 may include an evolved node B (eNB) comprising: means for transmitting first connection information via a first air interface to a first plurality of UEs over a first partition, wherein the first partition is associated with a first category of communication and the first connection information is to enable the first plurality of UEs to establish communication with the eNB via the first partition; and means for transmitting second connection information via a second air interface to a second plurality of UEs over a second partition, wherein the second partition is associated with a second category of communication and the second connection information is to enable the second plurality of UEs to establish communication with the eNB via the second partition.

Example 27 may include the subject matter of Example 26, wherein the second connection information includes resource information of the first partition and designates the first partition as a secondary serving cell, and further comprising: means for performing carrier aggregation between the first partition and the second partition via cross carrier scheduling.

Example 28 may include the subject matter of Example 26, wherein the first plurality of UEs are associated with a first access class and the second plurality of UEs are associated with one or more additional access classes.

Example 29 may include the subject matter of Example 28, wherein the first connection information defines access class barring parameters that utilize the one or more additional access classes to prevent the second plurality of UEs from establishing communication with the eNB over the first partition and the second connection information defines access class barring parameters that utilize the first access class to prevent the first plurality of UEs from establishing communication with the eNB over the second partition.

Example 30 may include the subject matter of Example 26, wherein the first plurality of UEs are relatively lower cost UEs than the second plurality of UEs, and wherein a first control channel format of the first air interface is designed for relatively lower cost UEs.

Example 31 may include the subject matter of Example 30, wherein the first control channel format is designed to prevent the second plurality of UEs from establishing communication with the eNB over the first partition, and a second control channel format of the second air interface is designed to prevent the first plurality of UE's from establishing communication with the eNB over the second partition.

Example 32 may include the subject matter of Example 30, wherein first connection information includes a first system information block 1 (SIB1) and the second physical connection information includes a second SIB1, wherein a format of the first SIB1 is to prevent the second plurality of UEs from establishing communication with the eNB over the first partition and a format of the second SIB1 is to prevent first plurality of UEs from establishing communication with the eNB over the second partition.

Example 33 may include the subject matter of any one of Examples 26-32, wherein the first category of communication is machine type communication (MTC) designed for relatively lower cost implementation than the second category of communication and the first plurality of UEs are all MTC UEs designed for the relatively lower cost implementation.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An evolved node B (eNB) comprising:
   logic circuitry to: partition a communication band into a first partition for a first category of communication and a second partition for a second category of communication, wherein the first partition is associated with a first control channel format and the second partition is associated with a second control channel format; and
   transceiver circuitry, coupled with the logic circuitry, to:
   transmit first connection information in the first control channel format to a first plurality of user equipments (UEs) over the first partition to enable the first plurality of UEs to establish communication with the eNB via the first partition, wherein the first plurality of UEs are configured for the first category of communication; and
   transmit second connection information in the second control channel format to a second plurality of UEs over the second partition to enable the second plurality of UEs to establish communication with the eNB via the second partition, wherein the second plurality of UEs are configured for the second category of communication,
   wherein the first plurality of UEs are to be restricted from accessing the second partition; and the second plurality of UEs are to be restricted from accessing the first partition, unless a secondary serving cell is formed in the first partition for a UE of the second plurality of UEs.

2. The eNB of claim 1, wherein the second connection information includes resource information of the first partition and designates the secondary serving cell within the first partition, and wherein the logic circuitry is further to schedule the secondary serving cell in the first partition from a primary serving cell in the second partition via cross carrier scheduling.

3. The eNB of claim 1, wherein the first plurality of UEs are associated with a first access class and the second plurality of UEs are associated with one or more additional access classes.

4. The eNB of claim 3, wherein the first connection information defines access class barring parameters that utilize the one or more additional access classes to prevent the second plurality of UEs from establishing communication with the eNB over the first partition and the second connection information defines access class barring parameters that utilize the first access class to prevent the first plurality of UEs from establishing communication with the eNB over the second partition.

5. The eNB of claim 1, wherein the first plurality of UEs are relatively lower cost UEs than the second plurality of UEs, and wherein the first control channel format is designed for relatively lower cost UEs.

6. The eNB of claim 5, wherein the first control channel format is designed to prevent the second plurality of UEs from establishing communication with the eNB over the first partition, and the second control channel format is designed to prevent the first plurality of UE's from establishing communication with the eNB over the second partition.

7. The eNB of claim 5, wherein the first connection information includes a first system information block 1 (SIB1) and the second connection information includes a second SIB1, wherein a format of the first SIB1 is to prevent the second plurality of UEs from establishing communication with the eNB over the first partition and a format of the second SIB1 is to prevent the first plurality of UEs from establishing communication with the eNB over the second partition.

8. The eNB of claim 1, wherein the first category of communication is machine type communication (MTC) designed for relatively lower cost implementation than the second category of communication and the first plurality of UEs are all MTC UEs designed for the relatively lower cost implementation.

9. A method comprising:
   transmitting, by an evolved node B (eNB), first connection information via a first air interface to a first plurality of UEs over a first partition, wherein the first partition is associated with a first category of communication and the first connection information is to enable the first plurality of UEs to establish communication with the eNB via the first partition; and
   transmitting, by the eNB, second connection information via a second air interface to a second plurality of UEs over a second partition, wherein the second partition is associated with a second category of communication and the second connection information is to enable the second plurality of UEs to establish communication with the eNB via the second partition,
   wherein the first plurality of UEs are to be restricted from accessing the second partition; and the second plurality of UEs are to be restricted from accessing the first partition, unless a secondary serving cell is formed in the first partition for a UE of the second plurality of UEs.

10. The method of claim 9, wherein the second connection information includes resource information of the first partition and designates the secondary serving cell within the first partition, and further comprising: scheduling, by the eNB, the secondary serving cell in the first partition from a primary serving cell in the second partition via cross carrier scheduling.

11. The method of claim 9, wherein the first plurality of UEs are associated with a first access class and the second plurality of UEs are associated with one or more additional access classes.

12. The method of claim 11, wherein the first connection information defines access class barring parameters that utilize the one or more additional access classes to prevent the second plurality of UEs from establishing communication with the eNB over the first partition and the second connection information defines access class barring parameters that utilize the first access class to prevent the first plurality of UEs from establishing communication with the eNB over the second partition.

13. The method of claim 9, wherein the first plurality of UEs are relatively lower cost UEs than the second plurality of UEs, and wherein a first control channel format of the first air interface is designed for relatively lower cost UEs.

14. The method of claim 13, wherein the first control channel format is designed to prevent the second plurality of UEs from establishing communication with the eNB over the first partition, and a second control channel format of the second air interface is designed to prevent the first plurality of UE's from establishing communication with the eNB over the second partition.

15. The method of claim 13, wherein the first connection information includes a first system information block 1 (SIB1) and the second connection information includes a second SIB1, wherein a format of the first SIB1 is to prevent the second plurality of UEs from establishing communication with the eNB over the first partition and a format of the second SIB1 is to prevent the first plurality of UEs from establishing communication with the eNB over the second partition.

16. The method of claim 9, wherein the first category of communication is machine type communication (MTC) designed for relatively lower cost implementation than the second category of communication and the first plurality of UEs are all MTC UEs designed for the relatively lower cost implementation.

17. One or more computer-readable non-transitory media, having instructions stored thereon, the instructions, in response to execution by an eNB, to cause the eNB to:
transmit first connection information via a first air interface to a first plurality of UEs over a first partition, wherein the first partition is associated with a first category of communication and the first connection information is to enable the first plurality of UEs to establish communication with the eNB via the first partition; and
transmit second connection information via a second air interface to a second plurality of UEs over a second partition, wherein the second partition is associated with a second category of communication and the second connection information is to enable the second plurality of UEs to establish communication with the eNB via the second partition,
wherein the first plurality of UEs are to be restricted from accessing the second partition; and the second plurality of UEs are to be restricted from accessing the first partition, unless a secondary serving cell is formed in the first partition for a UE of the second plurality of UEs.

18. The computer-readable non-transitory media of claim 17, wherein the second connection information includes resource information of the first partition and designates the secondary serving cell within the first partition, and wherein the instructions further cause the eNB to schedule the secondary serving cell in the first partition from a primary serving cell in the second partition via cross carrier scheduling.

19. The computer-readable non-transitory media of claim 17, wherein the first plurality of UEs are associated with a first access class and the second plurality of UEs are associated with one or more additional access classes, and wherein the first connection information defines access class barring parameters that utilize the one or more additional access classes to prevent the second plurality of UEs from establishing communication with the eNB over the first partition and the second connection information defines access class barring parameters that utilize the first access class to prevent the first plurality of UEs from establishing communication with the eNB over the second partition.

20. The computer-readable non-transitory media of claim 17, wherein the first plurality of UEs are relatively lower cost UEs than the second plurality of UEs, and wherein a first control channel format of the first air interface is designed for relatively lower cost UEs, and wherein the first control channel format is designed to prevent the second plurality of UEs from establishing communication with the eNB over the first partition, and a second control channel format of the second air interface is designed to prevent the first plurality of UE's from establishing communication with the eNB over the second partition.

21. The computer-readable non-transitory media of claim 17, wherein the first category of communication is machine type communication (MTC) designed for relatively lower cost implementation than the second category of communication and the first plurality of UEs are all MTC UEs designed for the relatively lower cost implementation.

22. A user equipment (UE) comprising:
transceiver circuitry to:
receive first connection information in a first control channel format from an evolved node B (eNB) over a first partition; and
receive second connection information in a second control channel format from the eNB over a second partition; and
logic circuitry, coupled with the transceiver circuitry, to:
determine one of the first connection information or the second connection information to utilize in establishing communication with the eNB via the first partition or the second partition, respectively,
wherein a first plurality of user equipments (UEs) designed for relatively lower cost implementation are to be restricted from accessing the second partition; and a second plurality of UEs designed for relatively higher-cost implementation are to be restricted from accessing the first partition, unless a secondary serving cell is formed in the first partition for a UE of the second plurality of UEs.

23. The UE of claim 22, wherein to determine one of the first connection information or the second connection information to utilize in establishing communication with the eNB via the first partition or the second partition, respectively, is based on one or more of:

whether the UE is capable of decoding one of the first connection information or the second connection information; and access class barring parameters contained within one or both of the first connection information or the second connection information.

24. The UE of claim 22, wherein the first control channel format is designed for a first category of communication and the second control channel format is designed for a second category of communication.

25. The UE of claim 24, wherein the first category of communication is machine type communication (MTC) designed for relatively lower cost implementation than the second category of communication, and wherein the UE is associated with the first category of communication.

* * * * *